(12) United States Patent
Todd

(10) Patent No.: US 7,090,015 B2
(45) Date of Patent: Aug. 15, 2006

(54) METHODS OF TREATING SUBTERRANEAN ZONES AND VISCOUS AQUEOUS FLUIDS CONTAINING XANTHAN AND A COMBINATION CROSS-LINKER—BREAKER

(75) Inventor: Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 291 days.

(21) Appl. No.: 10/616,532

(22) Filed: Jul. 10, 2003

(65) Prior Publication Data

US 2005/0006091 A1    Jan. 13, 2005

(51) Int. Cl.
*E21B 43/04* (2006.01)
*E21B 43/267* (2006.01)

(52) U.S. Cl. .................. 166/278; 166/300; 166/305.1; 166/308.5; 507/213; 507/276; 507/277; 507/903; 507/921; 507/922

(58) Field of Classification Search ................ 166/276, 166/278, 300, 305.1, 308.5; 507/213, 269, 507/276, 277, 903, 921, 922
See application file for complete search history.

(56) References Cited

U.S. PATENT DOCUMENTS

| 3,696,035 | A | | 10/1972 | Nimerick | |
|---|---|---|---|---|---|
| 3,700,032 | A | * | 10/1972 | Terry et al. | 166/283 |
| 5,095,987 | A | * | 3/1992 | Weaver et al. | 166/276 |
| 5,447,199 | A | * | 9/1995 | Dawson et al. | 166/300 |
| 5,806,597 | A | * | 9/1998 | Tjon-Joe-Pin et al. | 166/300 |
| 6,186,235 | B1 | * | 2/2001 | Tjon-Joe-Pin et al. | 166/300 |
| 6,422,314 | B1 | * | 7/2002 | Todd et al. | 166/312 |
| 6,454,008 | B1 | * | 9/2002 | Chatterji et al. | 166/308.6 |
| 6,494,263 | B1 | * | 12/2002 | Todd | 166/312 |
| 2004/0182575 | A1 | | 9/2004 | Reddy et al. | 166/294 |
| 2004/0186024 | A1 | * | 9/2004 | Todd | 507/200 |

FOREIGN PATENT DOCUMENTS

EP    1 223 207 A1    1/2002

OTHER PUBLICATIONS

Christensen, B. E., et al, *Gelation of Periodate Oxidised Scleroglucan (Scleraldehyde)*, Carbohydrate Polymers 46 (2001) 241-248.
Foreign Search Report and Opinion (PCT Appl. No. GB2004/002669), Dec. 3, 2004.

* cited by examiner

*Primary Examiner*—George Suchfield
(74) *Attorney, Agent, or Firm*—Robert A. Kent; Baker Botts

(57) ABSTRACT

Methods of treating subterranean zones and viscous aqueous fluids containing xanthan biopolymer gelling agent and a combination crosslinker and delayed breaker are provided. A viscous cross-linked aqueous treating fluid of the invention comprises water, a xanthan polymer gelling agent, and a combination cross-linker and delayed breaker for said xanthan biopolymer gelling agent.

27 Claims, No Drawings

METHODS OF TREATING SUBTERRANEAN ZONES AND VISCOUS AQUEOUS FLUIDS CONTAINING XANTHAN AND A COMBINATION CROSS-LINKER—BREAKER

BACKGROUND OF THE INVENTION

1. Field of the Invention

The present invention relates to methods of treating subterranean zones in formations penetrated by well bores with viscous cross-linked aqueous treating fluids that comprise water, a xanthan biopolymer gelling agent and a combination cross-linker and delayed breaker.

2. Description of the Prior Art

Viscous aqueous treating fluids are used in a variety of operations and treatments in oil and gas wells. Such operations and treatments include, but are not limited to, well completion operations, production stimulation treatments formation permeability conformance control treatments and the like.

An example of a well completion operation involving the use of high viscosity aqueous treating fluids is gravel packing. In gravel packing operations, solid particles referred to in the art as gravel, are carried to a subterranean zone in which a gravel pack is to be placed by a viscous cross-linked aqueous treating fluid. That is, particulate gravel material such as sand is suspended in the viscous cross-linked aqueous treating fluid at the surface and carried to the subterranean zone in which a gravel pack is to be placed. Once the particulate gravel material utilized is placed in the zone, the viscous cross-linked aqueous treating fluid, also referred to as a carrier fluid, breaks into a low viscosity fluid. The gravel pack produced functions as a filter to separate formation solids from produced fluids while permitting the produced fluids to flow into and through the well bore.

An example of a production stimulation treatment utilizing a viscous cross-linked aqueous treating fluid is hydraulic fracturing. That is, a viscous cross-linked aqueous treating fluid referred to in the art as a fracturing fluid, is pumped through the well bore into a subterranean zone to be stimulated at a rate and pressure such that fractures are formed and extended into the subterranean zone. At least a portion of the fracturing fluid carries solid particles such as sand, referred to in the art as proppant, which is carried into the formed fractures. The particulate proppant material is suspended in the viscous cross-linked aqueous fracturing fluid so that the particulate proppant material is deposited in the fractures when the fracturing fluid is broken, i.e., reduced to a low viscosity fluid. The particulate proppant material functions to prevent the formed fractures from closing whereby conductive channels are formed through which produced fluids can flow to the well bore.

The viscous cross-linked aqueous treating fluids utilized heretofore have been viscosified by combining a gelling agent with water. In order to increase the viscosity of the gelled water so that the treating fluid formed is capable of carrying particulate gravel material or particulate proppant material, the gelling agent in the water has been cross-linked by combining a cross-linking agent with the gelled water. In order to break the viscous cross-linked aqueous treating fluid after it has been placed in a subterranean zone, a separate delayed breaker has also been combined with the viscous cross-linked aqueous treating fluid. A particularly suitable gelling agent which is often utilized in gravel packing or fracturing subterranean zones is xanthan biopolymer. In order to cross-link the xanthan biopolymer gelling agent in water, a cross-linking agent such as sodium borate has been added to the gelled water and in order to break the viscous cross-linked aqueous treating fluid formed, a separate delayed breaker such as sodium persulfate has been added to the viscous cross-linked aqueous treating fluid. While the use of separate cross-linking agents and delayed breakers with an aqueous treating fluid containing xanthan biopolymer gelling agent has achieved good results, the cross-linker and delayed breaker have been expensive and require the use of separate pumping and metering equipment. Thus, there is a continuing need for improved cross-linking agents and delayed breakers which are less expensive and require the use of less equipment, etc.

SUMMARY OF THE INVENTION

The present invention provides improved methods of treating subterranean zones and viscous cross-linked aqueous treating fluids that meet the needs described above and overcome the deficiencies of the prior art. In accordance with the present invention, improved methods of treating subterranean zones and viscous cross-linked aqueous treating fluids are provided which utilize a combination cross-linker and delayed breaker for xanthan biopolymer gelling agent. That is, the combination cross-linker and delayed breaker is a single chemical compound that cross-links xanthan biopolymer and after a delayed time period also functions to break the viscous cross-linked aqueous treating fluid. The combination cross-linker and delayed breaker of the invention is particularly suitable for use with xanthan biopolymer gelled water in wells having low bottom hole temperatures in the range of from about 80° F. to about 160° F.

A method of the present invention for treating a subterranean zone penetrated by a well bore is comprised of the following steps. A viscous cross-linked aqueous treating fluid that comprises water, a xanthan biopolymer gelling agent and a combination cross-linker and delayed breaker for the xanthan biopolymer gelling agent is prepared or provided. The viscous cross-linked aqueous treating fluid is pumped into the subterranean zone to be treated and then allowed to break into a low viscosity fluid. The combination cross-linker and delayed breaker for xanthan biopolymer utilized is a metaperiodic acid salt.

A viscous cross-linked aqueous treating fluid of this invention for treating subterranean zones is comprised of water, a xanthan biopolymer gelling agent and a combination cross-linker and delayed breaker for the xanthan biopolymer gelling agent. The combination cross-linker and delayed gelling agent is a metaperiodic acid salt.

The objects, features and advantages of the present invention will be readily apparent to those skilled in the art upon a reading of the description of preferred embodiments which follows.

DESCRIPTION OF PREFERRED EMBODIMENTS

The present invention provides improved methods of treating subterranean zones penetrated by well bores where the subterranean zones have temperatures in the range of from about 80° F. up to about 160° F. The methods basically utilize a viscous cross-linked aqueous fracturing fluid that comprises water, a xanthan biopolymer gelling agent and a combination cross-linker and delayed breaker for the xanthan biopolymer gelling agent.

The water utilized in the treating fluid is selected from the group consisting of fresh water and salt water. The term "salt water" is used herein to mean unsaturated salt solutions and saturated salt solutions including brines and seawater.

The xanthan biopolymer gelling agent is generally present in the viscous cross-linked treating fluid in an amount in the range of from about 0.25% to about 1.5% by weight of water therein, more preferably in an amount of from about 0.5% to about 0.75% and most preferably about 0.6%.

The combination cross-linker and delayed breaker for the xanthan biopolymer gelling agent functions to cross-link the xanthan biopolymer and thereby increase the viscosity of the treating fluid for a period of time. The particular time depends on the bottom hole temperature of the subterranean zone being treated and the amount of the combination cross-linker and delayed breaker utilized. After the period of time that the xanthan biopolymer is cross-linked during which the treating fluid is placed in the subterranean zone to be treated and remains in the subterranean zone, the combination cross-linker and delayed breaker functions to break the viscous cross-linked aqueous treating fluid whereby its viscosity is reduced and can be recovered from the subterranean zone. As is well understood by those skilled in the art, when the treating fluid contains suspended particulate gravel or proppant material, the particulate gravel or proppant material is deposited in the subterranean zone or in fractures formed therein when the viscous cross-linked aqueous treating fluid is broken into a low viscosity fluid. The viscosity of the treating fluid when cross-linked is generally in the range of from about 20 centipoises to about 70 centipoises (measured at 511 sec-1 on a Fann Model 35 viscometer with standard bob and sleeve) and after the treating fluid is broken, it has a viscosity in the range of from about 1 centipoise to about 10 centipoises.

The combination cross-linker and delayed breaker of this invention is a metaperiodic acid salt. Examples of metaperiodic acid salts which can be utilized include, but are not limited to, potassium metaperiodate, sodium metaperiodate, ammonium metaperiodate, calcium metaperiodate, and lithium metaperiodate. Of these, potassium metaperiodate is preferred. The metaperiodic acid salt utilized is present in the viscous cross-linked aqueous treating fluid of this invention in an amount in the range of from about 0.1% to about 1.5% by weight of the water therein.

A method of this invention for placing a gravel pack in a subterranean zone penetrated by a well bore, i.e., placing particulate gravel material in the subterranean zone, is comprised of the following steps. A viscous cross-linked carrier fluid comprising water, a xanthan biopolymer gelling agent, a combination cross-linker and delayed breaker for the xanthan biopolymer gelling agent, and suspended particulate gravel material is prepared or provided. The viscous cross-linked aqueous carrier fluid is introduced into the subterranean zone and then allowed to break into a low viscosity fluid whereby the particulate gravel material is deposited in the subterranean zone. The viscous cross-linked aqueous carrier fluid includes the components and amounts of the components as described above.

The suspended particulate gravel material included in the carrier fluid is selected from the group consisting of graded sand, bauxite, ceramic materials, glass materials and polymer beads. Of these, graded sand is generally preferred.

The suspended particulate gravel material is included in the viscous cross-linking aqueous carrier fluid in a general amount in the range of from about 10% to about 250% by weight of water in the carrier fluid.

A method of this invention for fracturing a subterranean zone penetrated by a well bore and depositing particulate proppant material in the fractures formed comprises the following steps. A viscous cross-linked aqueous fracturing fluid that comprises water, a xanthan biopolymer gelling agent, a combination cross-linker and delayed breaker for the xanthan biopolymer gelling agent and suspended particulate proppant material is prepared or provided. The viscous cross-linked aqueous fracturing fluid is introduced into the subterranean zone at a rate and pressure sufficient to fracture the subterranean zone. Thereafter, the viscous cross-linked aqueous fluid is allowed to break into a low viscosity fluid whereby the particulate proppant material is deposited in the fractures and the low viscosity fluid is recovered. The components and their amounts in the viscous cross-linked aqueous fracturing fluid are the same as those described above.

Examples of the suspended particulate proppant material in the fracturing fluid include, but are not limited to, graded sand, bauxite, ceramic materials, glass materials, and polymer beads. Of these, graded sand is generally preferred.

The suspended particulate proppant material is generally present in the fracturing fluid in an amount in the range of from about 10% to about 250% by weight of the water in the fracturing fluid.

A preferred method of the present invention for treating a subterranean zone penetrated by a well bore comprises the steps of: (a) preparing or providing a viscous cross-linked aqueous treating fluid that comprises water, a xanthan biopolymer gelling agent and a combination cross-linker and delayed breaker for the xanthan biopolymer gelling agent; (b) introducing the viscous cross-linked aqueous treating fluid into the subterranean zone; and (c) allowing the viscous cross-linked aqueous treating fluid to break into a low viscosity fluid.

A preferred method of this invention for placing particulate gravel material in a subterranean zone penetrated by a well bore comprises the steps of: (a) preparing or providing a viscous cross-linked aqueous carrier fluid that comprises water, a xanthan polymer gelling agent, a combination cross-linker and delayed breaker for the xanthan polymer gelling agent, and suspended particulate gravel material; (b) introducing the viscous cross-linked aqueous carrier fluid into the subterranean zone; and (c) allowing the viscous cross-linked aqueous carrier fluid to break into a low viscosity fluid whereby the particulate gravel material is deposited in the subterranean zone.

A preferred method of this invention for fracturing a subterranean zone penetrated by a well bore and depositing particulate proppant material in the fractures formed comprises the steps of (a) preparing or providing a viscous cross-linked aqueous fracturing fluid that comprises water, a xanthan biopolymer gelling agent, a combination cross-linker and delayed breaker for the xanthan biopolymer gelling agent, and suspended particulate proppant material; (b) introducing the viscous cross-linked aqueous fracturing fluid into the subterranean zone at a rate and pressure sufficient to fracture the subterranean zone; and (c) allowing the viscous cross-linked aqueous fracturing fluid to break into a low viscosity fluid whereby the particulate proppant material is deposited in the fractures and the low viscosity fluid is recovered.

A preferred viscous cross-linked aqueous treating fluid of this invention for treating subterranean zones comprises: water; a xanthan biopolymer gelling agent; and a combination cross-linker and delayed breaker for the xanthan biopolymer gelling agent.

In order to further illustrate the methods and aqueous treating fluids of the present invention, the following examples are given.

EXAMPLE

A 60 pound per 1000 gal xanthan gel (in a 9.7 pound/gal potassium chloride/sodium bromide brine) was prepared in the laboratory as follows. A mixture comprised of 893 milliliters of water, 0.04 grams of biocide, 0.94 grams of citric acid for complexing iron in the water and preventing premature cross-linking thereby, 116.4 grams of potassium chloride clay stabilizer, 130.4 grams of sodium bromide weighting material, 0.5 milliliters of 20° Baume hydrochloric acid for adjusting the pH and dispersing the xanthan gelling agent, and 7.2 grams of xanthan gelling agent was first prepared. The mixture was stirred for 2 minutes after which 5.4 millilieters of caustic solution was added to raise the pH and cause the xanthan gelling agent to yield viscosity. 20 milliliters of a de-emulsifier was then added to the gel, and various amounts of potassium metaperiodate cross-linker/breaker were added to samples of the gel. The samples were tested for cross-linking and breaking at various times. The results of the tests are set forth in the Table below.

TABLE

| Metaperiodate cross-linker/breaker, pounds/1000 gal | Viscosities Over Time Time Hrs | | | | |
|---|---|---|---|---|---|
| | 1 hr | 2 hrs | 3 hrs | 1 day | 2 days |
| 10 | 61 cP | 63 cP | 66 cP | 46 cP | 42 cP |
| 25 | XL | XL | XL | 15 | 14 |
| 50 | XL | XL | XL | 8 | 8 |
| 75 | XL | XL | 17 | 3 | 3 |
| 100 | XL | XL | XL | 1.5 | 1 |

XL means cross-linked.

From the Table it can be seen that the metaperiodate cross-linker/breaker functions in the xanthan gel as a cross-linker and then breaks the cross-linked gel to a low viscosity fluid.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

The invention claimed is:

1. A method of treating a subterranean zone penetrated by a well bore comprising the steps of:
   (a) preparing or providing a viscous cross-linked aqueous treating fluid that comprises water, a xanthan biopolymer gelling agent and a combination cross-linker and delayed breaker for said xanthan biopolymer gelling agent;
   (b) introducing said viscous cross-linked aqueous treating fluid into said subterranean zone; and
   (c) allowing said viscous cross-linked aqueous treating fluid to break into a low viscosity fluid.

2. The method of claim 1 wherein said water in said treating fluid is selected from the group consisting of fresh water and salt water.

3. The method of claim 1 wherein said xanthan biopolymer gelling agent is present in said treating fluid in an amount in the range of from about 0.25% to about 1.5% by weight of water therein.

4. The method of claim 1 wherein said combination cross-linker and delayed breaker is a metaperiodic acid salt.

5. The method of claim 1 wherein said combination cross-linker and delayed breaker is selected from the group consisting of potassium metaperiodate, sodium metaperiodate, ammonium metaperiodate, calcium metaperiodate and lithium metaperiodate.

6. The method of claim 1 wherein said combination cross-linker and delayed breaker is potassium metaperiodate.

7. The method of claim 1 wherein said combination cross-linker and delayed breaker is present in said treating fluid in an amount in the range of from about 0.1% to about 1.5% by weight of said water therein.

8. A method of placing particulate gravel material in a subterranean zone penetrated by a well bore comprising the steps of:
   (a) preparing or providing a viscous cross-linked aqueous carrier fluid that comprises water, a xanthan biopolymer gelling agent, a combination cross-linker and delayed breaker for said xanthan biopolymer gelling agent, and suspended particulate gravel material;
   (b) introducing said viscous cross-linked aqueous carrier fluid into said subterranean zone; and
   (c) allowing said viscous cross-linked aqueous carrier fluid to break into a low viscosity fluid whereby said particulate gravel material is deposited in said subterranean zone.

9. The method of claim 8 wherein said water in said carrier fluid is selected from the group consisting of fresh water and salt water.

10. The method of claim 8 wherein said xanthan biopolymer gelling agent is present in said carrier fluid in an amount in the range of from about 0.25% to about 1.5% by weight of water therein.

11. The method of claim 8 wherein said combination cross-linker and delayed breaker is a metaperiodic acid salt.

12. The method of claim 8 wherein said combination cross-linker and delayed breaker is selected from the group consisting of potassium metaperiodate, sodium metaperiodate, ammonium metaperiodate, calcium metaborate and lithium metaborate.

13. The method of claim 8 wherein said combination cross-linker and delayed breaker is potassium metaperiodate.

14. The method of claim 8 wherein said combination cross-linker and delayed breaker is present in said carrier fluid in an amount in the range of from about 0.1% to about 1.5% by weight of said water therein.

15. The method of claim 8 wherein said suspended particulate gravel material in said carrier fluid is selected from the group consisting of graded sand, bauxite, ceramic materials, glass materials, and polymer beads.

16. The method of claim 8 wherein said suspended particulate gravel material in said carrier fluid is graded sand.

17. The method of claim 8 wherein said suspended particulate gravel material is present in said carrier fluid in an amount in the range of from about 10% to about 250% by weight of water therein.

18. A method of fracturing a subterranean zone penetrated by a well bore and depositing particulate proppant material in the fractures formed comprising the steps of:

(a) preparing or providing a viscous cross-linked aqueous fracturing fluid that comprises water, a xanthan biopolymer gelling agent, a combination cross-linker and delayed breaker for said xanthan biopolymer gelling agent, and suspended particulate proppant material;

(b) introducing said viscous cross-linked aqueous fracturing fluid into said subterranean zone at a rate and pressure sufficient to fracture said subterranean zone; and (c) allowing said viscous cross-linked aqueous fracturing fluid to break into a low viscosity fluid whereby said particulate proppant material is deposited in said fractures and said low viscosity fluid is recovered.

19. The method of claim 18 wherein said water in said fracturing fluid is selected from the group consisting of fresh water and salt water.

20. The method of claim 18 wherein said xanthan biopolymer gelling agent is present in said fracturing fluid in an amount in the range of from about 0.25% to about 1.5% by weight of water therein.

21. The method of claim 18 wherein said combination cross-linker and delayed breaker is a metaperiodic acid salt.

22. The method of claim 18 wherein said combination cross-linker and delayed breaker is selected from the group consisting of potassium metaperiodate, sodium metaperiodate, ammonium metaperiodate, calcium metaperiodate and lithium metaperiodate.

23. The method of claim 18 wherein said combination cross-linker and delayed breaker is potassium metaperiodate.

24. The method of claim 18 wherein said combination cross-linker and delayed breaker is present in said fracturing fluid in an amount in the range of from about 0.1% to about 1.5% by weight of said water therein.

25. The method of claim 18 wherein said suspended particulate proppant material in said fracturing fluid is selected from the group consisting of graded sand, bauxite, ceramic materials, glass materials, and polymer beads.

26. The method of claim 18 wherein said suspended particulate proppant material in said fracturing fluid is graded sand.

27. The method of claim 18 wherein said suspended particulate proppant material is present in said fracturing fluid in an amount in the range of from about 10% to about 250% by weight of water therein.

\* \* \* \* \*